Nov. 9, 1954 W. L. HACK 2,694,133
AUTOMATIC CONTROLLER
Filed Oct. 9, 1950 3 Sheets-Sheet 1

INVENTOR.
WALTER L. HACK
BY
Townsend and Townsend
ATTORNEYS

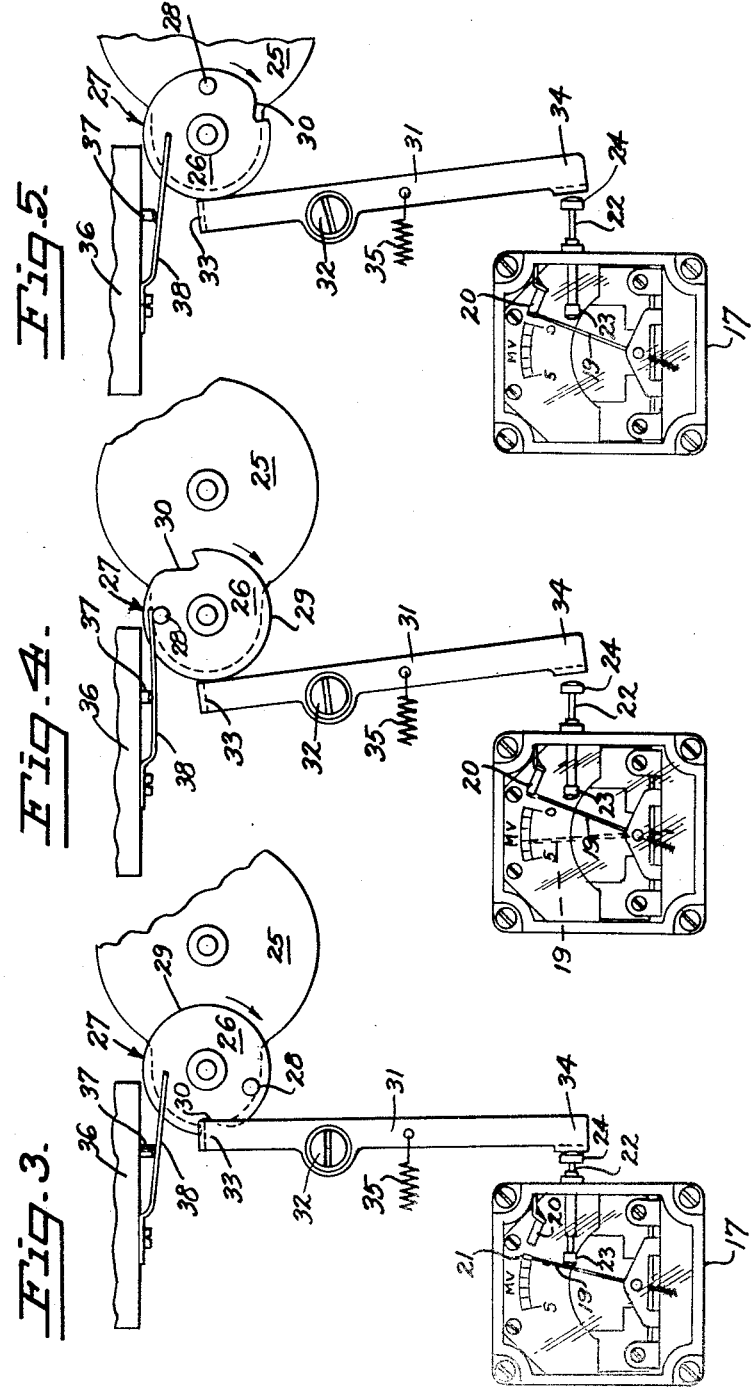

2,694,133
Patented Nov. 9, 1954

2,694,133

AUTOMATIC CONTROLLER

Walter L. Hack, San Carlos, Calif., assignor to Western Gold & Platinum Works, San Francisco, Calif., a corporation of California Application October 9, 1950, Serial No. 189,140

2 Claims. (Cl. 219—20)

This invention relates to controllers and more particularly to automatic controllers for various devices such as furnaces and the like wherein the operating variable to be controlled may be measured electrically. For purposes of description and example of use the controller will be described herein with reference to an electric furnace such as used in chemical or metallurgical laboratories.

It is a principal object of the present invention to provide a controller of the character mentioned which is not dependent upon the use of electronic tubes. The controller of the present invention is characterized by its maintained accuracy resultant from the inherent stability of the circuit constants and measuring elements employed.

A further advantage of the invention is that the controller is compact, comparatively insensitive to vibration and shock, and relatively inexpensive to manufacture and facile of use.

Other objects and advantages will become apparent upon reading the following specification and referring to the accompanying drawings in which similar characters of reference represent corresponding parts in each of the several views.

In the drawings:

Fig. 3 is an enlarged view of a portion of the mechanism illustrated in Fig. 2 showing one portion of the cycle of operation;

Fig. 4 is a view similar to Fig. 3 showing another portion of the cycle of operation;

Fig. 5 is a view similar to Figs. 3 and 4 showing still another portion of the cycle of operation.

Figure 1:
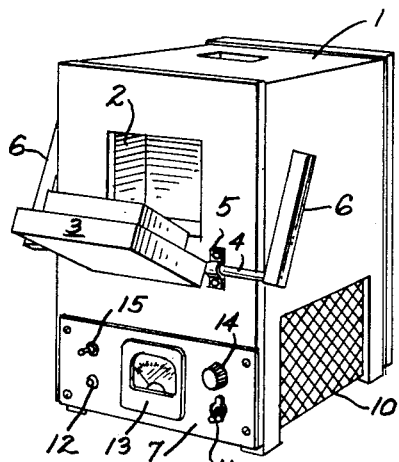
Fig. 1 is an angular elevational view showing the front and one side of an electric furnace incorporating a preferred embodiment of the invention.
Figure 2:
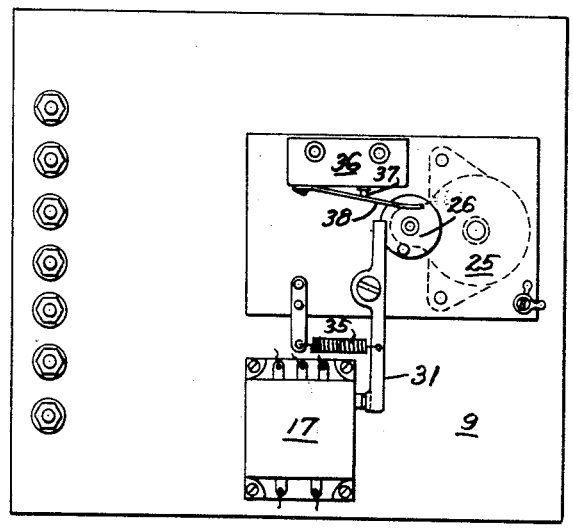
Fig. 2 is a bottom view of a portion of the control mechanism looking upwardly from the bottom of Fig. 1, with the instrument panel omitted.

To illustrate the invention, the drawings show an automatic electric furnace equipped with the improved automatic controls which comprise this invention. For ease of understanding, the specification describes in order the mechanical construction of the elements, the electrical circuit, and the mode of operation.

Preliminarily, the automatic control is illustrated in conjunction with an electric furnace and, in the preferred embodiment, serves to hold the temperature of an electrical furnace within a few degrees, plus or minus, indefinitely.

The electric furnace

The electric furnace, in conjunction with which the automatic control is illustrated, comprises a cabinet 1 provided with a furnace chamber 2. The chamber 2 is closed by a furnace door 3 supported upon a pivot pin 4 mounted in brackets 5. Handles 6 are secured at either end of the pivot pin 4 and are used for opening and closing the furnace door 3. A control panel 7 is provided in the lower portion of the cabinet 1 and a completely automatic ultra-sensitive controller, or sensing unit 9 is mounted within the interior of the lower portion of the cabinet 1. A grill work 10 is provided at either side of the cabinet 1 to protect the operating mechanism and to permit air circulation.

The control panel

The illustrated embodiment of the invention is shown in conjunction with a control panel for regulating the operation of the furnace and the automatic ultra-sensitive controller. The front or control panel comprises a double pole single throw off-on switch 11, a pilot light 12, an electric pyromillivoltmeter 13, a 6 ohm potentiometer 14 for selecting the temperature at which the furnace is to be held, and a double-pole double-throw switch 15. The electric pyromillivoltmeter 13 is a millivoltmeter which is used in conjunction with a thermocouple 16 located within the chamber 2 of the electric furnace. The thermocouple 16, preferably, is a Chromel-Alumel bimetal thermocouple delivering 46.8 millivolts at 2100° F., and the electric pyromillivoltmeter 13 is a scale calibrated to indicate 2100° F. at high reading with 46.8 millivolts impressed across it. The pyromillivoltmeter should have an internal resistance of 46 ohms or better. The electrical details of the control panel are described after the description of the mechanical details of the automatic controller.

The sensing unit

The ultra sensitive controller or sensing unit 9 utilizes an ultra-sensitive instrument type relay 17 of the "magnetic-contact" type. The disclosed relay is essentially a millivoltmeter of the permanent-magnet movable coil type having a coil 18, a contact making pointer 19 and a stop 20. The preferable range is 0 to 5 millivolts or more sensitive and the internal resistance is preferably 1000 ohms or higher. In place of ordinary contact points which might be brought together, the contacts of the sensitive electrical relay are made of a magnetic material. An iron rider 21 is affixed to the pointer, and the stop 20, which is the stationary contact, is made of a magnetic material. When the moving contact is within sufficient proximity to the magnetic contact to allow the magnetic flux to take effect, contact is established with a pressure far greater than would be obtained with non-magnetic contact points.

It is well known that magnetic contact relays "make" contact at the calibrated value but do not "break" contact with a subsequent decrease in the actuating energy below the level of making contact. Therefore, a resetting plunger 22 is provided to break the magnetic contact between elements 20 and 21. This resetting plunger 22 is mounted in the side of the relay 17. The interior end 23 is formed so as to abut the pointer 19 and the exterior end 24 is provided to actuate the plunger.

A motor driven cam operated mechanism is provided to reset the sensitive electrical relay 17, automatically at regular time intervals. This resetting mechanism comprises an electric motor 25 of the electric clock type. The motor 25 preferably is a 110 volt, 60 cycle, A. C. synchronous clock motor, geared down to 4 revolutions per minute and having about 7.5 inch ounces of torque at this speed. The electric motor 25 drives a rotatable cam carrier 26. This cam carrier is provided with two cams, 27 and 28. The cam 27 is a peripheral cam mounted upon the periphery of the cam carrier 26, and is provided with a substantially circular cam surface 29 and a cam detent 30. The cam 28 is a pin type cam mounted on the side face of the cam carrier 26.

The peripheral cam 27 is arranged to contact one end of a lever 31. The lever 31 is arranged for pivotal movement on a pivot 32. One end 33 of the lever 31 is arranged to contact the circumferential surface 29 and the cam detent 30 of the peripheral cam 27 and the opposite end 34 is arranged to contact the exterior end 24 of the resetting plunger 22. A spring 35 is secured to the lever 31 so as to maintain the end 33 in close engagement with the peripheral cam 27.

It will be apparent that as the cam carrier 26 rotates in a clockwise direction, Figs. 2 to 5, both inclusive, the end 34 of the pivoted lever 31 will be out of contact with the exterior end 24 of the resetting plunger 22 for a major portion of the cycle of operation of the cam carrier. However, at one interval in each rotation of the cam carrier 26, the end 33 of the pivoted lever 31 will drop in the cam detent 30. This urges the pivoted lever in a clock-wise direction thereby causing the end 34 to urge the resetting plunger 22 inwardly. This movement separates the magnetic elements 20 and 21.

The pin type cam 28 is mounted upon the cam carrier 26 to actuate a single-pole double-throw switch 36. The switch 36 is preferably a precision type dust proof snap action switch, provided with silver contacts, of the type illustrated in the McGall Patent No. 1,960,020, issued May 22, 1934. The switch 36 is provided with an operating plunger 37 which in turn contacts an operating finger 38. The operating finger 38 is placed in proximity with the orbit of the pin cam 28 so that the switch 36 will be operated once during each revolution of the cam carrier 26.

The electrical circuit

Figure 6:
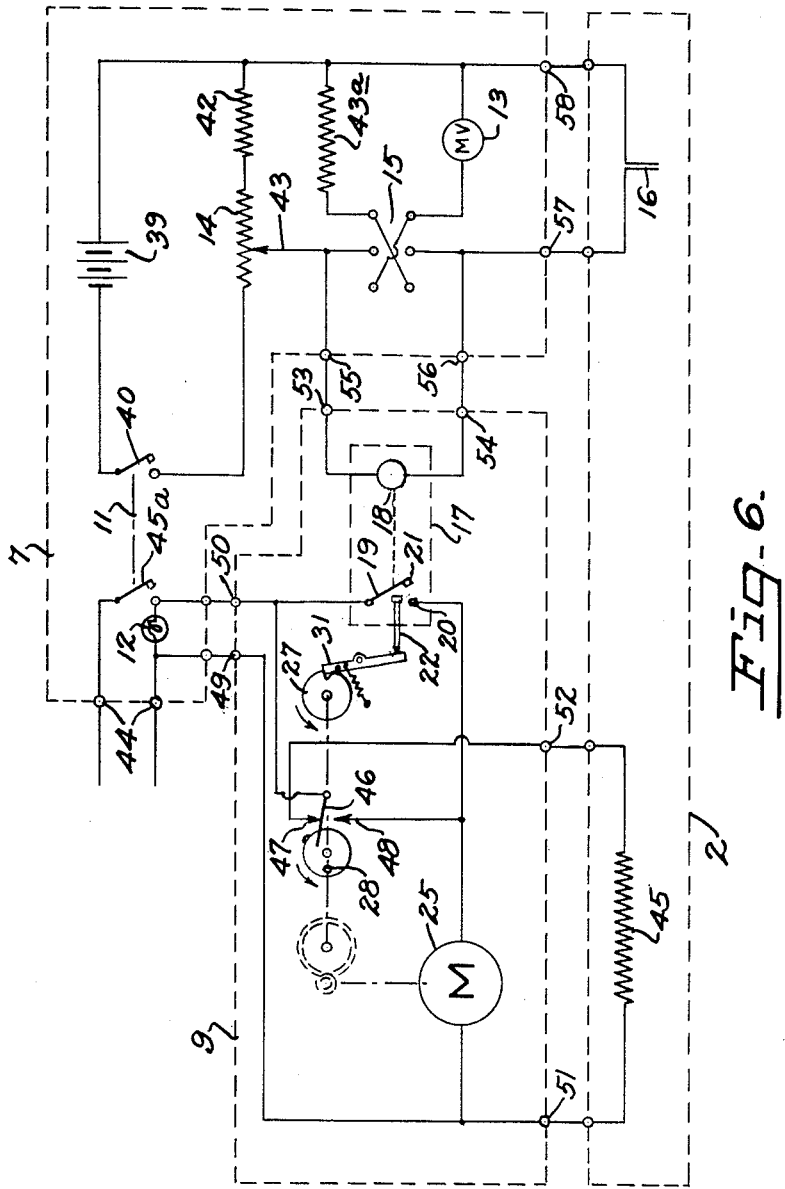
Fig. 6 is a line drawing of the electrical circuit.

The electrical circuit is illustrated in Fig. 6 of the drawings. The control panel assembly 7 includes all of the elements within the dotted line designated 7, and the automatic controller includes all of the elements within the dotted line designated 9.

One of the features of the control panel assembly is the provision of a monitoring circuit for monitoring the operation of the controller 9. This monitoring circuit has a source of adjustable direct current. In the illustrated embodiment, this source of direct current is supplied by conventional dry cells 39, preferably producing about 3 volts. The positive pole of the dry cells 39 is connected to pole 40 of the double-pole single-throw off-on switch 11. From thence the circuit comprises the resistance element of the potentiometer 14, a fixed resistance 42, and the negative pole of the dry cell 39.

The slider 43 of the potentiometer 14 is connected to one of the poles of the double-pole double-throw switch 15 and is also connected to the positive terminal of the coil 18 of the sensitive electrical relay 17. The negative terminal of the coil 18 is connected to the other pole of the switch 15 and to the positive terminal of the thermocouple 16.

The negative pole of the battery 39 is connected to a resistance 43a, to the negative terminal of the electrical pyromillivoltmeter 13 and to the negative terminal of the thermocouple 16. The other terminal of the resistance 43a and the positive terminal of the electrical pyromillivoltmeter 13 are connected respectively to diametrically oppositely interconnected throws of the switch 15. The value of resistance 43a is selected so that it is identical with the internal resistance of the pyromillivoltmeter 13.

The mode of operation of the foregoing monitoring circuit will be discussed later in this specification. The foregoing control circuit operates in conjunction with the completely automatic ultra-sensitive controller 9 and controls the operation of the controller.

The control circuit 9 is used to control a circuit interconnecting a 110 volt, 60 cycle A. C. source of power supply 44 to the heating coil 45 located in the chamber 2 of the electric furnace. One of the lines from the power source 44 is connected to the pilot light 12, located on the control panel 7, to the clock motor 25 located on the controller panel and to one side of the heating element 45 located in the chamber 2 of the electric furnace. The other line of this power source 44 is connected through the pole 45a of the double-pole single-throw off-on switch 11 to the contact 21 on the pointer 19 of the sensitive electrical relay 17, to the pilot light 12 and to the pole 46 of the single-pole double-throw switch 36. The throw 47 of switch 36 which makes contact when the finger 38 is operated by the pin cam 28 is connected to the opposite end of the heating element 45. The other throw 48 of the single-pole double-throw switch 36 is connected to the motor 25 and to the stationary contact 20 of the sensitive relay 17.

This completes the electrical circuit of the preferred embodiment of this invention. This specification next describes the mode of operation.

Mode of operation

The selected embodiment of this invention is used to control the operation of an electric furnace. The first step in the operation of the device is to select the operating temperature at which the furnace is to be operated. In order to do this, the switch 11 is thrown to the "on" position. This closes the poles 40 and 45a of the switch 11.

The closing of switch 40 establishes the monitoring circuit comprising the dry cell 39, the switch 40, the potentiometer 14 and the resistance 42. The switch 15 is now thrown to the "set" position, that is with the poles to the left viewing Fig. 6. This establishes a circuit comprising the slider 43, and the pyromillivoltmeter 13. A parallel circuit comprising the resistance 43a and the thermocouple 16 is established in series with the coil 18 of the sensitive relay 17. This latter circuit is arranged in parallel with the pyromillivoltmeter 13. A serious setting error is prevented by the high internal resistance of the coil 18 of the relay 17. The slider 43 is next adjusted until the pyromillivoltmeter 13 reads the temperature which is desired in the furnace. This pre-sets the control circuit. The pre-selection having been accomplished, the switch 15 is now thrown over to the control position. This position is with the poles to the right, viewing Fig. 6. In this position the circuits are substantially the same as heretofore mentioned with the exception that the pyromillivoltmeter 13 and the resistance 43a have been interchanged in the circuit. The pyromillivoltmeter 13 is now in parallel with the thermocouple 16 and indicates the temperature within the chamber 2 of the furnace.

The operation of sensing unit 9 is now described. In off position the pole 40 was open and no current was flowing through the coil 18 either from the battery 39 or from the thermocouple 16. As a result the instrument read zero and the contact points 20 and 21 were closed. When the switch 11 is thrown to on, poles 40 and 45a of switch 11 are both closed. Thus a circuit is established from the power source 44 through the motor 25, through the contacts 20 and 21, through the switch 45a and back to the power source 44. This starts the motor 25 and rotates the cam carrier 26.

Assuming that the last cycle of operations stopped at the position indicated in Figure 4, as the cam carrier rotates the pin cam 28 is disengaged from the operating finger 38 (see Fig. 5). This closes switch contacts 46 and 48 and establishes a holding circuit in parallel with the switch contacts 20 and 21. Continued operation of the motor 25 rotates the cam carrier 26 until the end 33 of the pivoted lever 31 drops in the cam detent 30 (Fig. 3). This breaks the magnetic contact between the contacts 20 and 21 and opens the electrical circuit established by these contacts. Contacts 20 and 21 will be maintained in the open position if the furnace is not up to temperature. However, the holding circuit established by the closing of contacts 46 and 48 maintains the motor 25 in operation. The motor continues to operate until the pin cam 28 contacts the operating finger 38 of the switch 36. This breaks contacts 46 and 48 and closes contacts 46 and 47. The motor circuit is now broken and a circuit is established from the power source 44 through the heating coil 45 through contacts 47 and 46, through switch 45a back to the power source 44.

Closing of the foregoing heating circuit commences the heating of the furnace. As the furnace gets warmer and warmer the thermocouple 16 produces more and more electromotive force. As soon as the temperature of the interior of the furnace reaches the pre-set figure, the electromotive force produced by the thermocouple 16 will balance the electromotive force produced by the dry cells 39. When this point of balance is reached the current flowing through the coil 18 of the ultra-sensitive relay 17 will drop to zero. The magnetic contacts 20 and 21 will now close and the foregoing cycle of operation will be repeated to again set the control circuit into operation. The motor will continue rotating to test the temperature until the temperature drops below the pre-set figure. When this happens the contacts 20 and 21 will be opened and the motor will stop with the elements in the dotted line position illustrated in Fig. 4.

Alternative arrangements

It will become apparent that the controller 9 is useful in connection with environments other than that disclosed herein. To that end, the controller 9 is provided with power input terminals, 49 and 50, with power output terminals, 51 and 52, and with control input terminals 53 and 54. The controller may be used to replace the more complicated controllers now known to the art in a variety of installations by connecting the power input terminals 49 and 50 to a suitable source of power, by connecting the power output terminals 51 and 52 to the device to be controlled, and by connecting the control input terminals 53 and 54 to the control device.

It will also become apparent that the monitoring circuit provided on the control panel 7 has a utility in environments other than that herein illustrated. To that end, the control panel 7 is provided with monitoring output terminals 55 and 56 and with sensing input terminals 57 and 58. The monitoring circuit thereby may be used to replace circuits now known to the art by connecting monitoring output terminals 55 and 56 to the device to be monitored and by connecting sensing input terminals 57 and 58 to the sensing device, in conjunction with which the monitoring circuit is to operate.

Changes may be made in the form, construction and ararngement of the parts without departing from the spirit of the invention, the invention being defined by the following claims.

The invention is claimed as follows:

1. A monitoring circuit for an operative coil type automatic ultra-sensitive controller having a source of direct current, means for adjusting the potential of said source of direct current, a source of direct current of variable potential which is to be measured, a potentiometric circuit inter-connecting said two sources of direct current and the operating coil of said automatic ultra-sensitive controller, an electric meter of fixed internal resistance for measuring the potential of said source of variable direct current, said electric meter being calibrated in the units to be measured, a fixed resistance of the same value as the internal resistance of said meter, and switch means adapted in one position to connect said meter in parallel with said fixed source of direct current and to connect said resistance in parallel with said source of said variable direct current and adapted in another position to connect said resistance in parallel with said fixed source of direct current and to connect said meter in parallel with said source of variable direct current, said first position serving as a pre-setting position to adjust the potential of the fixed source of electric current to the desired control potential, and said second position serving as a measuring position to connect the meter to said variable source of direct current whereby the potential to be measured may be read, whereby the resistance balance of the monitoring circuit is identical in both the pre-setting and measuring positions.

2. An electric furnace and control therefor comprising the combination of an electric furnace, power terminals, a heating coil for said electric furnace, a power circuit connecting said heating coil to said power terminals, an electric switch in said power circuit for opening and closing said power circuit, an electric motor, a motor circuit connecting said electric motor to said power terminals, an electric switch in said motor circuit for opening and closing said motor circuit, a sensitive electric relay having a coil, a movable magnetic contact member and a magnetic stop, the contact member and stop of said relay being connected in parallel with said second mentioned switch, cam means operable by said motor and mechanically connected to said first and second mentioned switches and to said magnetic contact member and arranged to maintain said first mentioned switch closed and said second mentioned switch opened during one portion of the cycle of the cam, to maintain said first mentioned switch open and said second mentioned switch closed during a second portion of the cycle of the cam and to separate the magnetic contact member from the magnetic stop during an interval of the second portion of the cycle of the cam, a monitoring circuit comprising a control circuit including a source of direct current of selectively adjustable potential, a sensing circuit including a thermocouple associated with said electric furnace, a potentiometric circuit inter-connecting the control circuit, the coil of the relay and the sensing circuit, an electric pyromillivoltmeter for measuring the potential of said thermocouple, an electrical resistance of the same value as the value of the resistance of said electric pyromillivoltmeter and switch means being adapted in one position to connect said electric pyromillivoltmeter in parallel with said control circuit and said resistance in parallel with said sensing circuit and in another position to connect said pyromillivoltmeter in parallel with said sensing circuit and said resistance in parallel with said control circuit, said first mentioned position serving as a presetting position to select the temperature at which the furnace is to operate and said second mentioned position serving as a measuring position to indicate the actual temperature of the furnace.

References Cited in the file of this patent

UNITED STATES PATENTS

| Number | Name | Date |
|---|---|---|
| 1,533,225 | Colby | Apr. 14, 1925 |
| 1,813,216 | Werner | July 7, 1931 |
| 1,893,847 | Simpson | Jan. 10, 1933 |
| 2,010,697 | Lord | Aug. 6, 1935 |
| 2,014,386 | Lamb | Sept. 17, 1935 |
| 2,014,387 | Lamb | Sept. 17, 1935 |
| 2,025,134 | Stammberger | Dec. 24, 1935 |
| 2,045,821 | Austin | June 30, 1936 |
| 2,045,883 | Stroud | June 30, 1936 |
| 2,046,860 | Wilhjelm | July 7, 1936 |
| 2,089,826 | Cunningham | Aug. 10, 1937 |
| 2,135,506 | Hansch | Nov. 8, 1938 |
| 2,395,912 | Schrenk et al. | Mar. 5, 1946 |
| 2,509,827 | Krogh | May 30, 1950 |